(12) United States Patent
Weiss et al.

(10) Patent No.: US 9,994,452 B2
(45) Date of Patent: Jun. 12, 2018

(54) INTEGRATED PROCESS FOR NATIVE $CO_2$ RECOVERY FROM A SOUR GAS COMPRISING $H_2S$ AND $CO_2$

(71) Applicants: Total SA, La Defense (FR); L'Air Liquide Societe Anonyme pour L'Etude et L'Exploitation des Procedes Georges Claude, Paris (FR)

(72) Inventors: Claire Weiss, Vaucresson (FR); Kamlesh Ghodasara, Clichy (FR); Frederic Pousse, Paris (FR); Wolfgang Nehb, Frankfurt am Main (DE); Eckhard Jungst, Frankfurt am Main (FR); Stefan Fraenkle, Frankfurt am Main (DE); Sandeep Karode, Boothwyn, PA (US); Sylvain Gerard, Saint-cloud (FR); Nicolas Chambron, Nogent sur Marne (FR)

(73) Assignees: TOTAL SA, Courbevoie (FR); L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 0 days. days.

(21) Appl. No.: 14/413,073

(22) PCT Filed: Jun. 13, 2013

(86) PCT No.: PCT/EP2013/062250
§ 371 (c)(1),
(2) Date: Jan. 6, 2015

(87) PCT Pub. No.: WO2014/005817
PCT Pub. Date: Jan. 9, 2014

(65) Prior Publication Data
US 2015/0191360 A1 Jul. 9, 2015

Related U.S. Application Data

(60) Provisional application No. 61/668,689, filed on Jul. 6, 2012.

(51) Int. Cl.
*C01B 31/20* (2006.01)
*B01J 19/24* (2006.01)
(Continued)

(52) U.S. Cl.
CPC .............. *C01B 31/20* (2013.01); *B01D 53/75* (2013.01); *B01J 19/245* (2013.01);
(Continued)

(58) Field of Classification Search
CPC .. B01D 53/75; B01D 53/002; B01D 53/1462; B01D 53/22; B01D 2252/204;
(Continued)

(56) References Cited

U.S. PATENT DOCUMENTS

| 4,919,912 A | 4/1990 | Taggart et al. |
| 6,245,127 B1 * | 6/2001 | Kane ................. B01D 53/0446 95/101 |

(Continued)

FOREIGN PATENT DOCUMENTS

EP 1338557 8/2003

OTHER PUBLICATIONS

International Search Report in PCT/EP2013/062250 dated Aug. 30, 2013.

*Primary Examiner* — Daniel C McCracken
(74) *Attorney, Agent, or Firm* — McAndrews, Held & Malloy, Ltd.

(57) ABSTRACT

The invention relates to a method for treating a hydrocarbon feed gas stream containing $CO_2$ and $H_2S$ to recover a purified $CO_2$ gas stream (vii), comprising: a. Separating said feed gas stream into a sweetened gas stream (i), and an acid gas stream (ii); b. Introducing stream (ii) into a Claus unit wherein an oxygen-rich stream is used as a combustive agent in the Claus furnace, thereby recovering a liquid stream of elemental sulfur (iii) and a tail gas stream (iv); c. Introducing the stream (iv) into a Tail Gas Treatment Unit (TGTU) thereby separating said tail gas stream into a $CO_2$ enriched gas stream (v), and a stream enriched in sulfur compounds (vi); d. Compressing stream (v) exiting the TGTU; e. Passing the compressed $CO_2$ enriched gas through a $CO_2$ purification unit thereby recovering a purified $CO_2$ gas stream (vii), and the device for carrying out said method.

16 Claims, 4 Drawing Sheets

(51) Int. Cl.
| | | |
|---|---|---|
| *C10L 3/10* | (2006.01) | |
| *B01D 53/75* | (2006.01) | |
| *C01B 17/04* | (2006.01) | |
| *B01D 53/00* | (2006.01) | |
| *B01D 53/04* | (2006.01) | |
| *B01D 53/14* | (2006.01) | |
| *B01D 53/22* | (2006.01) | |

(52) U.S. Cl.
CPC ...... *C01B 17/0404* (2013.01); *C01B 17/0456* (2013.01); *C10L 3/103* (2013.01); *C10L 3/104* (2013.01); *B01D 53/002* (2013.01); *B01D 53/04* (2013.01); *B01D 53/1462* (2013.01); *B01D 53/22* (2013.01); *B01D 2252/204* (2013.01); *B01D 2256/24* (2013.01); *B01D 2256/245* (2013.01); *B01D 2257/304* (2013.01); *B01D 2257/504* (2013.01); *B01J 2219/24* (2013.01); *C10L 2290/30* (2013.01); *C10L 2290/541* (2013.01); *Y02P 20/125* (2015.11); *Y02P 20/152* (2015.11)

(58) Field of Classification Search
CPC .......... B01D 2256/24; B01D 2256/245; B01D 2257/304; B01D 2257/504; B01D 53/04; C01B 17/0404; C01B 17/0456; C01B 31/20; B01J 19/245; B01J 2219/24; C10L 3/103; C10L 3/104; C10L 2290/30; C10L 2290/541; Y02P 20/152
See application file for complete search history.

(56) References Cited

U.S. PATENT DOCUMENTS

| | | | |
|---|---|---|---|
| 6,962,680 B1 * | 11/2005 | Ishigaki | .............. C01B 17/0404 |
| | | | 423/244.09 |
| 2012/0279728 A1 * | 11/2012 | Northrop | ........... B01D 53/1462 |
| | | | 166/401 |
| 2013/0017144 A1 | 1/2013 | Menzel | |

\* cited by examiner

INTEGRATED PROCESS FOR NATIVE $CO_2$ RECOVERY FROM A SOUR GAS COMPRISING $H_2S$ AND $CO_2$

The present application is filed pursuant to 35 U.S.C. 371 as a U.S. National Phase application of International Patent Application No. PCT/EP2013/062250, which was filed Jun. 13, 2013, claiming the benefit of priority to U.S. Provisional Patent Application No. 61/668,689, which was filed on Jul. 6, 2012. The entire text of the aforementioned applications is incorporated herein by reference in its entirety.

FIELD OF THE INVENTION

The present invention relates to the removal of sulfur components and carbon dioxide contained in a hydrocarbon feed stream in order to recover the native carbon dioxide in a purified stream. More specifically, the present invention relates to a process for recovering native $CO_2$ from a sour gas which contains $CO_2$, $H_2S$ and other sulfur compounds, so that the recovered $CO_2$ may be then sequestered or used for enhanced oil recovery (EOR). Besides, the present invention concerns an installation for implementing such process.

BACKGROUND

Natural gas or gases associated to oil productions produced from geological reservoirs, or refinery acid gases often contain(s) acid contaminants, such as carbon dioxide and/or hydrogen sulfide and/or other sulfur compounds, such as mercaptans, COS, $CS_2$, S . . . . For most of the applications of these gas streams, the acid contaminants need to be removed, either partially or almost completely, depending on the application and the type of contaminant.

Methods to remove carbon dioxide and/or hydrogen sulfide and/or other sulfur compounds from a hydrocarbon stream are known in the prior art.

One common approach to remove acid contaminants involves the use of solvents such as chemical solvent (amine-based solvent), hybrid solvent or physical solvent. These solvents have been largely disclosed in the art. However, if appreciable levels of sulfur compounds are present in the acid gas, the most common process to eliminate hydrogen sulfide is to convert said hydrogen sulfide into a non-hazardous product such as elemental sulfur, by sending it to a sulfur recovery unit ("SRU").

The Claus process is a known type of sulfur recovery process allowing the conversion of hydrogen sulfide into elemental sulfur. In a first step of said Claus process, the hydrogen sulfide is partially burned with air in a Claus furnace to form sulfur dioxide that will react, in a second step, with hydrogen sulfide to form elemental sulfur according to the following reactions:

  (1)

  (2)

In some embodiments, remaining $H_2S$ traces are captured in a Tail Gas Treatment Unit (TGTU), positioned at the outlet of the Claus unit to increase significantly sulfur recovery.

At the outlet of the TGTU, native $CO_2$ is diluted by a large amount of nitrogen coming from the air used for Claus combustion. To recover a purified $CO_2$ stream, $CO_2$ capture technologies using solvent (for example an amine based solvent, such as methylethanolamine (MEA) can be used. However, since the $CO_2$ is diluted in a large volume of nitrogen, the amine based $CO_2$ capture unit requires large size equipments, thereby impacting both CAPEX and OPEX.

Furthermore, an incinerator is generally connected at the outlet of the amine based $CO_2$ capture unit in order to incinerate continuously the remaining traces of sulfur compounds, hydrogen, carbon monoxide and hydrocarbons. It leads to significant fuel gas consumption and to important gaseous $CO_2$ emissions, which constitutes a major drawback of such methods known in the art.

Therefore, there is a need for a method that allows recovering native $CO_2$ from a hydrocarbon feed gas stream which contains acidic compounds, such as $CO_2$, $H_2S$ and other sulfur compounds, with better yields, lower investments, lower $CO_2$-emissions and reduced energy consumption compared with the processes of the prior art.

The present invention meets all these needs by providing a method wherein:
- A purified $CO_2$ stream comprising at least 90% of $CO_2$ may be recovered,
- An oxygen-rich stream is used as a combustive agent for the Claus unit, thereby reducing the size and cost of the equipments,
- Hydrogen may be efficiently separated from the $CO_2$ stream and recovered,
- An incinerator which works continuously is not required, thereby reducing the energy consumption of the system and the carbon dioxide emission in the atmosphere,
- Part of the $CO_2$ stream may be recycled into the Claus furnace to cool it down and facilitate the oxygen-rich operations;

Unless otherwise indicated, all percentages mentioned in the present patent application are expressed as molar percentages.

SUMMARY OF THE INVENTION

Method

An object of the present invention is a method for treating a hydrocarbon feed gas stream containing at least carbon dioxide and hydrogen sulfide to recover a purified $CO_2$ gas stream (vii), said process comprising the following steps:
a. Separating said hydrocarbon feed gas stream into a sweetened hydrocarbon gas stream (i), and an acid gas stream (ii) comprising at least carbon dioxide and hydrogen sulfide;
b. Introducing said acid gas stream (ii) into a Claus unit, wherein an oxygen-rich stream is used as a combustive agent in the Claus furnace, thereby recovering a liquid stream of elemental sulfur (iii) and a tail gas stream (iv) mainly comprising carbon dioxide, hydrogen and sulfur compounds;
c. Introducing the exiting tail gas stream (iv) into a Tail Gas Treatment Unit (TGTU) thereby separating said tail gas stream into a $CO_2$ enriched gas stream also containing hydrogen and sweetened in sulfur compounds (v), and a gas stream enriched in sulfur compounds (vi);
d. Compressing the $CO_2$ enriched gas stream (v) exiting the TGTU;
e. Passing the compressed $CO_2$ enriched gas stream through a $CO_2$ purification unit thereby recovering a purified $CO_2$ gas stream (vii).

In one embodiment, the combustive agent used in the Claus furnace of the Claus unit is an oxygen-rich stream, wherein the amount of nitrogen does not exceed 50%, is preferably less than 40%, more preferably less than 20%, and more preferably less than 10%.

In one embodiment, the tail gas stream (iv), the $CO_2$ enriched gas stream (v) and the purified $CO_2$ gas stream (vii) also contain nitrogen.

In one embodiment, the acid gas stream (ii) is enriched in $H_2S$ by an acid gas enrichment unit located upstream the Claus unit.

In one embodiment, the TGTU comprises a feed inline burner or a tail gas heater, a hydrogenation reactor, a quench contactor and optionally an absorber unit, in particular an absorber unit based on amine.

In one embodiment, a $CO_2$ enriched gas stream exiting the compression unit is dehydrated before entering the $CO_2$ purification unit.

In one embodiment, the $CO_2$ purification unit is a cryogenic separation unit producing a purified $CO_2$ gas stream (vii) and a lean $CO_2$ stream (viii).

In one embodiment, the $CO_2$ purification unit is a membrane unit producing a purified $CO_2$ gas stream (vii) on the residue side and a lean $CO_2$ stream (viii) on the permeate side.

In one embodiment, the $CO_2$ purification unit is an adsorption unit producing a purified $CO_2$ gas stream (vii) and a lean $CO_2$ stream (viii).

In one embodiment, the $CO_2$ purification unit is an absorption unit producing a purified $CO_2$ gas stream (vii) and a lean $CO_2$ stream (viii).

In one embodiment, the $CO_2$ purification unit is a combination of $CO_2$ purification units.

In one embodiment, part of the Claus tail gas stream (iv) is recycled into the Claus furnace before introduction to the TGTU.

In one embodiment, part of the gas stream inside the Claus unit is recycled into the Claus furnace by internal recycling.

In one embodiment, part of the gas stream exiting the quench tower of the TGTU is recycled into the Claus furnace before introduction to the absorber unit.

In one embodiment, part of the purified $CO_2$ gas stream (vii) exiting the $CO_2$ purification unit is recycled into the Claus furnace.

In one embodiment, part of the lean $CO_2$ stream (viii) exiting the $CO_2$ purification unit is recycled upstream of or directly in the Claus furnace.

In one embodiment, part of the lean $CO_2$ stream (viii) exiting the $CO_2$ purification unit is recycled between the Claus unit and the hydrogenation reactor of the TGTU.

In one embodiment, step d) is eliminated.

Device

The present invention also relates to a device for carrying out the method as described above.

The device of the present invention comprises in the direction of flow:
an acid gas removal unit providing an acid gas stream;
a Claus unit operated with an oxygen-rich stream;
a tail gas treatment unit removing sulfur components;
a compression device; and
a $CO_2$ purification device.

In one embodiment, the tail gas treatment unit comprises a feed inline burner or a tail gas heater, a hydrogenation reactor, a quench contactor and optionally an absorber unit, in particular an absorber unit based on an amine.

In one embodiment, the device further comprises an acid gas enrichment unit located upstream the Claus unit.

In one embodiment, the device further comprises a dehydration device.

In one embodiment, the $CO_2$ purification device is a cryogenic separation unit.

In one embodiment, the $CO_2$ purification device is a membrane unit.

In one embodiment, the $CO_2$ purification device is an adsorption unit.

In one embodiment, the $CO_2$ purification device is an absorption unit.

In one embodiment, the $CO_2$ purification device is a combination of $CO_2$ purification units.

In one embodiment, the device further comprises a recycle line for collecting part of the gas stream between the Claus unit and the TGTU and injecting it into the Claus furnace.

In one embodiment, the device further comprises a recycle line for collecting part of the gas stream inside the Claus unit and injecting it into the Claus furnace by internal recycling.

In one embodiment, the device further comprises a recycle line for collecting part of the gas stream between the quench tower and the absorber unit of the TGTU and injecting into the Claus furnace.

In one embodiment, the device further comprises a recycle line for collecting part of the purified $CO_2$ gas stream (vii) exiting the $CO_2$ purification unit and injecting into the Claus furnace.

In one embodiment, the device further comprises a recycle line for collecting part of the lean $CO_2$ stream (viii) exiting the $CO_2$ purification unit and injecting upstream of or directly into the Claus furnace.

In one embodiment, the device further comprises a recycle line for collecting part of the lean $CO_2$ stream (viii) exiting the $CO_2$ purification unit and injecting between the Claus unit and the hydrogenation reactor of the TGTU.

DETAILED DESCRIPTION OF THE INVENTION

Figure 1:
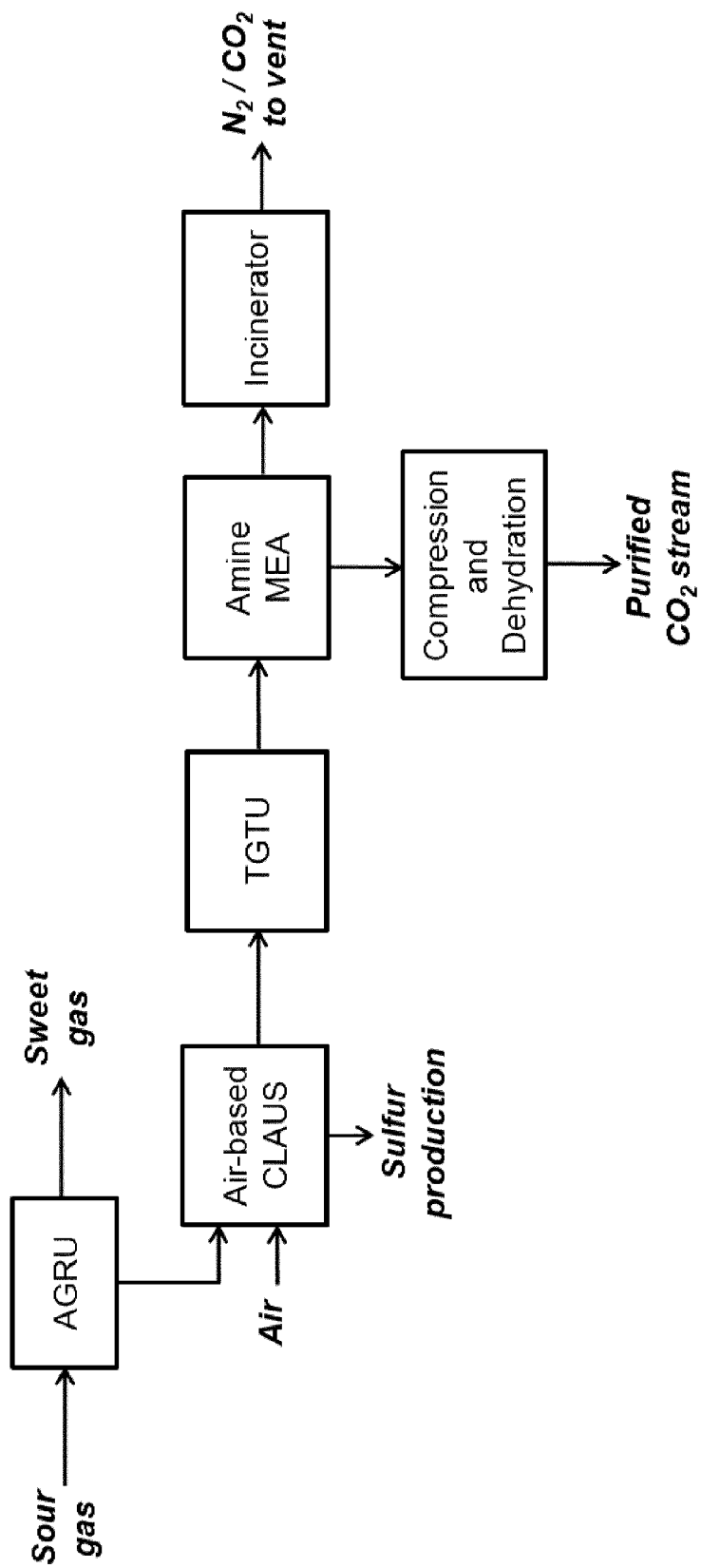
FIG. 1 is a schematic view of a classical native $CO_2$ recovery unit, as known in the prior art.

The process according to the invention applies to the treatment of a hydrocarbon gas stream containing acid contaminants, such as a natural gas stream or refinery gas stream. The acid contaminants are mainly composed of carbon dioxide and hydrogen sulfide. However, the gas stream may also contain other acid contaminants, like sulfur compounds, in particular mercaptans.

Typically, the hydrocarbon feed gas stream may contain (on a dry basis) from 1% to 70% of $CO_2$, in particular from 2% to 40% of $CO_2$, more particularly from 3% to 20% of $CO_2$, and from 0.5% to 50% of $H_2S$, in particular from 0.5% to 40% of $H_2S$, more particularly from 0.5% to 20% of $H_2S$.

According to step a) of the method of the invention, the hydrocarbon feed gas stream is separated into a sweetened hydrocarbon gas stream (i), and an acid gas stream (ii) comprising at least carbon dioxide and hydrogen sulfide.

By "sweetened hydrocarbon gas stream", it is meant a hydrocarbon gas stream containing less acid contaminants than the hydrocarbon feed gas stream. The acid gas stream (ii), on the other hand, is enriched in acid contaminants compared to the hydrocarbon feed gas stream.

Methods for obtaining a sweetened hydrocarbon gas stream (i) and acid gas stream (ii) from a hydrocarbon feed gas stream containing acid contaminants are well known by the person skilled in the art. Any sweetening method may be used for performing step a) of the present invention. Such methods include solvent treatment, such as chemical solvent treatment, in particular amine based solvent treatment, hybrid solvent treatment or physical solvent treatment.

Typically, the acid gas stream (ii) contains (on a dry basis) from 10% to 90% of $CO_2$, in particular from 25% to 75% of $CO_2$, and from 10% to 90% of $H_2S$, in particular from 25% to 75% of $H_2S$.

According to step b) of the method of the invention, the acid gas stream (ii) is then introduced into a Claus unit wherein an oxygen-rich stream (also named "oxygen or oxygen plus air") is used as a combustive agent in the Claus furnace (also named combustion furnace), thereby recovering (iii) a liquid stream of elemental sulfur (iii) and a tail gas stream (iv) mainly comprising carbon dioxide, hydrogen and sulfur compounds.

In one embodiment, the acid gas stream (ii) is enriched in an acid gas enrichment unit located upstream the Claus unit to increase the $H_2S$ content in the acid gas stream (ii).

As explained previously, a Claus unit allows the conversion of hydrogen sulfide into elemental sulfur according to the following reactions:

$$2H_2S + 3O_2 \rightarrow SO_2 + 2H_2O \quad (1)$$

$$2H_2S + SO_2 \leftrightarrows 3S + 2H_2O. \quad (2)$$

In a Claus unit, air is generally used as a combustive agent for the conversion of hydrogen sulfide into sulfur dioxide. However, since air contains around 80% of nitrogen and 20% of oxygen, the use of air as a combustive agent results in large volume of nitrogen in the process gas stream, which in turn requires equipments of large size.

According to the present invention, an oxygen-rich stream is used as a combustive agent, instead of air, in order to reduce the process gas volume. By "oxygen-rich stream", it is meant a stream containing an amount of oxygen from 20% to 100%, preferably from 70% to 100% and more preferably from 97% to 100%. The balanced components can be $CO_2$, $N_2$, Ar, Xe, $H_2$, $H_2O$, etc. . . .

In one embodiment, the combustive agent used in the Claus furnace of the Claus unit is an oxygen-rich stream, wherein the amount of nitrogen does not exceed 50%, is preferably less than 40%, more preferably less than 20%, and more preferably less than 10%.

The oxygen-rich stream may be obtained from atmospheric air by using an air separation unit (ASU) which separates atmospheric air into its primary components: mostly nitrogen and oxygen, and sometimes also argon and other rare inert gases. Any suitable method of separation may used in the process of the invention, for instance cryogenic distillation.

The above described Claus reactions are strongly exothermic. Typically, the pressure in the Claus furnace is from 1.7 to 1.9 bara and the temperature should be maintained between 900° C. and 1450° C. The hot gas from the combustion chamber passes through steps of reaction and condensation to produce liquid elemental sulfur (iii).

The use of an oxygen-rich stream as a combustive agent in the Claus furnace promotes side reactions resulting in the formation of hydrogen. The tail gas stream (iv) downstream the Claus unit thus contains minor amounts of hydrogen.

Thus, according to the invention, the tail gas stream (iv) recovered at the exit of the Claus unit mostly contains carbon dioxide and water, but also contains a certain amount of hydrogen, nitrogen and possibly carbon monoxide, as well as traces of sulfur compounds, such as hydrogen sulfide and sulfur dioxide.

Depending on the $CO_2$ purification technology, the nitrogen content in the oxygen-rich stream may be adjusted depending on the content of nitrogen that can be accepted in the purified $CO_2$ stream.

The tail gas stream (iv) exiting the Claus unit generally contains (on a dry basis) at least 40% of $CO_2$, preferably from 50% to 90% of $CO_2$. Balanced components can be $H_2$, $N_2$, $H_2S$, $SO_2$, CO, Ar, COS, etc. . . .

According to step c) of the method of the invention, the tail gas stream (iv) exiting the Claus unit is introduced into a Tail Gas Treatment Unit (TGTU), thereby separating said tail gas stream (iv) into a $CO_2$ enriched gas stream (v) containing hydrogen and sweetened in sulfur compounds, and a gas stream enriched in sulfur compounds (vi).

The TGTU allows the conversion of the sulfur compounds of the tail gas stream (iv) into $H_2S$.

In one embodiment, the TGTU comprises four main equipments in the direction of flow:
- a feed inline burner or a tail gas heater for heating the tail gas stream (iv),
- a hydrogenation reactor for converting the sulphur compounds of the tail gas stream (iv) into $H_2S$,
- a quench contactor removing extra water from the gas stream and
- an absorber unit (amine-based) for separating the sulfur compounds (mainly $H_2S$) from the other constituents of the tail gas stream (iv).

The TGTU includes amine based tail gas treatment units or subdew point tail gas treatment or direct oxidation based tail gas treatment units. The TGTU used to implement the method of the invention is not limited to these TGTUs. Any type of TGTU may be suitable for implementing the method of the invention.

As a result, two streams are recovered at the exit of the TGTU: a $CO_2$ enriched gas stream containing hydrogen (v), and a gas stream enriched in sulfur compounds (vi) (i.e. containing more sulfur compounds than the tail gas (iv)) in the other hand.

Typically, the gas stream enriched in sulfur compounds (vi) is introduced into the Claus unit.

The feed inline burner/or tail gas heater positioned upstream of the hydrogenation reactor provides the heat and hydrogenation/or heat.

The hydrogenation reactor typically comprises a catalyst bed where sulphur compounds such as $SO_2$, S, COS and $CS_2$ are converted into $H_2S$. The hydrogenated stream is then passed through a quench contactor, preferably a water-quench tower, in order to reduce temperature and remove extra water.

The gas stream at quench outlet exiting the quench tower is then passed through an absorber unit, wherein sulfur compounds, mainly $H_2S$, are absorbed by an absorbing solution. Preferably, the absorber unit is an amine-based. A $CO_2$ enriched gas stream (v) is thus recovered from the absorber unit, that contains less than 500 ppm of $H_2S$, preferably less than 100 ppm of $H_2S$. The sulfur-containing stream is separated from the absorbing solution and recycled back to the Claus furnace.

Alternatively, the gas stream recovered at quench outlet may not be passed through the absorber unit if the content of $H_2S$ in the $CO_2$ stream is lower than the required $H_2S$ specification in the purified $CO_2$ stream. In that case, the TGTU only comprises a feed inline burner or a tail gas heater, a hydrogenation reactor and a quench contactor.

At the exit of the TGTU, the $CO_2$ enriched gas stream (v) generally contains (on a dry basis) at least 40% of carbon dioxide, preferably from 50% to 90% of carbon dioxide.

In one embodiment, the $CO_2$ enriched gas stream (v) also comprises nitrogen due to the presence of nitrogen in the oxygen-rich stream used as a combustive agent.

In other embodiments, according to step d) of the method of the invention, the $CO_2$ enriched gas stream (v) exiting the TGTU is compressed, preferably at a pressure from 10 bar to 100 bar, more preferably from 20 bar to 60 bar. Of course, the compression step may be eliminated if the purification technology does not require it.

In one embodiment, the compressed $CO_2$ enriched gas stream is passed through a dehydration unit in order to complete the removal of water contained in the $CO_2$ stream. Preferably, the dehydration unit is a glycol or an adsorption unit but any other suitable dehydration technique may be used.

According to step e) of the method of the invention, the compressed $CO_2$ enriched gas stream is then passed through a $CO_2$ purification unit, such as $CO_2/H_2$ separation unit, thereby recovering a purified $CO_2$ gas stream (vii) in one hand and a lean CO2 stream (viii) in the other hand, which comprises hydrogen.

Any suitable $CO_2$ purification unit may be used. Preferably, the $CO_2$ purification unit is a cryogenic separation unit, a membrane unit, an adsorption unit, an absorption unit or a combination thereof.

The cryogenic separation unit produces a purified $CO_2$ gas stream (vii) and a non-condensable stream (viii) containing $H_2$, $CO_2$, $N_2$, Ar, etc. . . . which may be thus recovered for further use.

As for membrane separation, the $CO_2$ recovery rate is generally lower than that of cryogenic separation. However, since the membrane permeate comprises a large amount of carbon dioxide, it may be advantageously recycled to the Claus furnace in order to facilitate the oxygen-rich operations. In the case of membrane separation, the $CO_2$ recovery rate may be increased by recycling totally or part of the membrane permeate into the Claus furnace.

In case of low $CO_2$ content in the compressed $CO_2$ enriched gas stream, a combination of $CO_2$ purification units can be advantageously implemented to increase $CO_2$ recovery.

The $CO_2$ stream may be required to control the Claus furnace temperature and recycled at different stages of the process. Preferably, the recycled $CO_2$ stream is collected as upstream as possible in order to reduce the volume of gas to be treated by the downstream units.

In one embodiment, part of the gas stream exiting the quench tower of the TGTU is recycled into the Claus furnace before introduction to the absorber unit.

In one embodiment, part of the gas stream (iv) exiting the Claus unit is recycled into the Claus furnace before introduction to the TGTU.

In one embodiment, part of the gas stream inside the Claus unit is recycled into the Claus furnace by internal recycling.

In one embodiment, part of the purified $CO_2$ gas stream (vii) exiting the $CO_2$ purification unit is recycled into the Claus furnace.

In one embodiment, part of the lean $CO_2$ stream (viii) exiting the $CO_2$ purification unit is recycled between the Claus unit and the hydrogenation reactor of the TGTU.

In one embodiment, part of the lean $CO_2$ stream (viii) exiting the $CO_2$ purification unit is recycled upstream of or directly in the Claus furnace.

A combination of these recycles may be also performed.

The purified $CO_2$ stream (vii) obtained by the method of the invention may contain from 90% to 100% of $CO_2$, preferably from 97% to 99.9% of $CO_2$. It may be then sequestered or used for enhanced oil recovery (EOR).

In one embodiment, the purified $CO_2$ gas stream (vii) also contains nitrogen due to the presence of nitrogen in the oxygen-rich stream used as a combustive agent.

As previously mentioned, the purity of the $CO_2$ stream obtained by the method of the invention will depend on the type of combustive agent used in the Claus furnace, on the TGT technology and on the $CO_2$ purification technology. To obtain a $CO_2$ stream of high purity (98% or more), it is preferable to use high purity oxygen-rich stream (to Claus furnace). However, for a lower purity of produced $CO_2$ rich stream, lower purity of oxygen-rich stream (to Claus furnace) may be preferable because it is less expensive to implement.

Another object of the present invention is a device for carrying the method of the invention as previously described, said device comprising in the direction of flow:
an acid gas removal unit providing an acid gas stream;
a Claus unit operated with an oxygen-rich stream;
a tail gas treatment unit removing sulfur components;
a compression device; and
a $CO_2$ purification device.

The acid gas removal unit may be a unit performing a classical sweetening method such as chemical, hybrid or physical solvent. It may be for instance an amine washing unit. Amine solutions are well known by the person skilled in the art. According to the desired specification, the amine solutions may include DEA (di-ethanol amine), MDEA (methyl-di-ethanol amine) or activated MDEA or any other solution.

As previously mentioned, the combustive agent for the Claus unit may be an oxygen-rich stream. The oxygen-rich stream may be produced by an air separation unit. In addition, part of the purified $CO_2$ stream (vii) may be recycled into the Claus unit to facilitate the oxygen-rich operations.

In one embodiment, the device further comprises an acid gas enrichment unit located between the acid gas removal unit and the Claus unit to increase the $H_2S$ content in the stream.

In one embodiment, the tail gas treatment unit (TGTU) comprises in the direction of flow a feed inline burner/or a tail gas heater, a hydrogenation reactor, a quench contactor and optionally an absorber unit, in particular an absorber unit based on amine. As previously explained, it may not be necessary to include an absorber unit in the TGTU if the content of $H_2S$ in the $CO_2$ stream at the exit of the hydrogenation reactor is lower than the required specification in the purified $CO_2$ stream. In that case, the TGTU only comprises a feed inline burner/or a tail gas heater, a hydrogenation reactor and a quench contactor.

In one embodiment, TGTU includes subdew point tail gas treatment or direct oxidation based tail gas treatment units. The TGTU used to implement the method of the invention is not limited to these TGTUs. Any type of TGTU may be suitable for implementing the method of the invention.

In one embodiment, the device further comprises a dehydration device located upstream the $CO_2$ purification device. Depending on the compression configuration, dehydration can be located between two compression stages. Preferably, the $CO_2$ purification device is a cryogenic separation unit, a membrane unit, an adsorption unit or an absorption unit.

In one embodiment, the $CO_2$ purification device is a combination of $CO_2$ purification technologies.

The device may further comprise a one or several recycle lines as follows:
- a recycle line for collecting part of the gas stream (iv) between the Claus unit and the TGTU and injecting into the Claus furnace;
- a recycle line for collecting part of the gas stream inside the Claus unit is recycled into the Claus furnace,
- a recycle line for collecting part of the gas stream between the quench tower of the TGTU and the absorber unit and injecting into the Claus furnace,
- a recycle line for collecting part of the purified $CO_2$ gas stream (vii) exiting the $CO_2$ purification unit and injecting into the Claus furnace,
- a recycle line for collecting part of the lean $CO_2$ stream (viii) exiting the $CO_2$ purification unit and injecting between the Claus unit and the hydrogenation reactor of the TGTU,
- a recycle line for collecting part of the lean $CO_2$ stream (viii) exiting the $CO_2$ purification unit and injecting upstream of or directly into the Claus furnace.

The invention is further described in the FIGS. 1, 2, 3 and 4. These examples are offered to illustrate the invention and should in no way be viewed as limiting the invention.

FIG. 1 provides a schematic view of a classical $CO_2$ recovery unit, as known in the prior art.

In FIG. 1, a sour gas stream is introduced into an acid gas removal unit (AGRU), thereby providing a sweet gas stream and an acid gas stream containing 48% of carbon dioxide and 43% of hydrogen sulfide. The acid gas stream then enters a Claus unit at a pressure of 1-2 bar. In the Claus unit the hydrogen sulfide is converted into elemental sulfur using air containing 20% of oxygen and 80% of nitrogen as a combustive agent, therefore leading to the dilution of carbon dioxide with nitrogen. Then, this mixture enters a Tail Gas Treatment Unit (TGTU) to remove remaining traces of sulfur compounds, leading to a tail gas stream mixture composed of 60% of nitrogen, 30% of carbon dioxide and 10% of water. At the outlet of the TGTU, said mixture is then contacted with an amine-based solvent in order to capture the carbon dioxide, thereby separating the carbon dioxide from remaining nitrogen.

Typically, MethylEthanolAmine (MEA) is used as the most common amine solvent to capture the $CO_2$ from TGT off gas. After the step of absorption, the chemical amine solvent enriched in carbon dioxide is sent to a regenerator operating at a pressure comprised between 1 and 2 bara to recover the amine solvent depleted in carbon dioxide and to provide a stream of gaseous carbon dioxide saturated with water. After the steps of compression and dehydration (typically using a TEG unit), a stream composed of about 99.9% of carbon dioxide and 600 ppm of hydrogen sulfide is obtained.

The remaining mixture exiting the $CO_2$ capture absorber comprising 87% of nitrogen, 4% of carbon dioxide, 6% of water and 3% of hydrogen is sent to the incinerator.

As a result typical native $CO_2$ recovery of such capture is about 90%.

Figure 2:
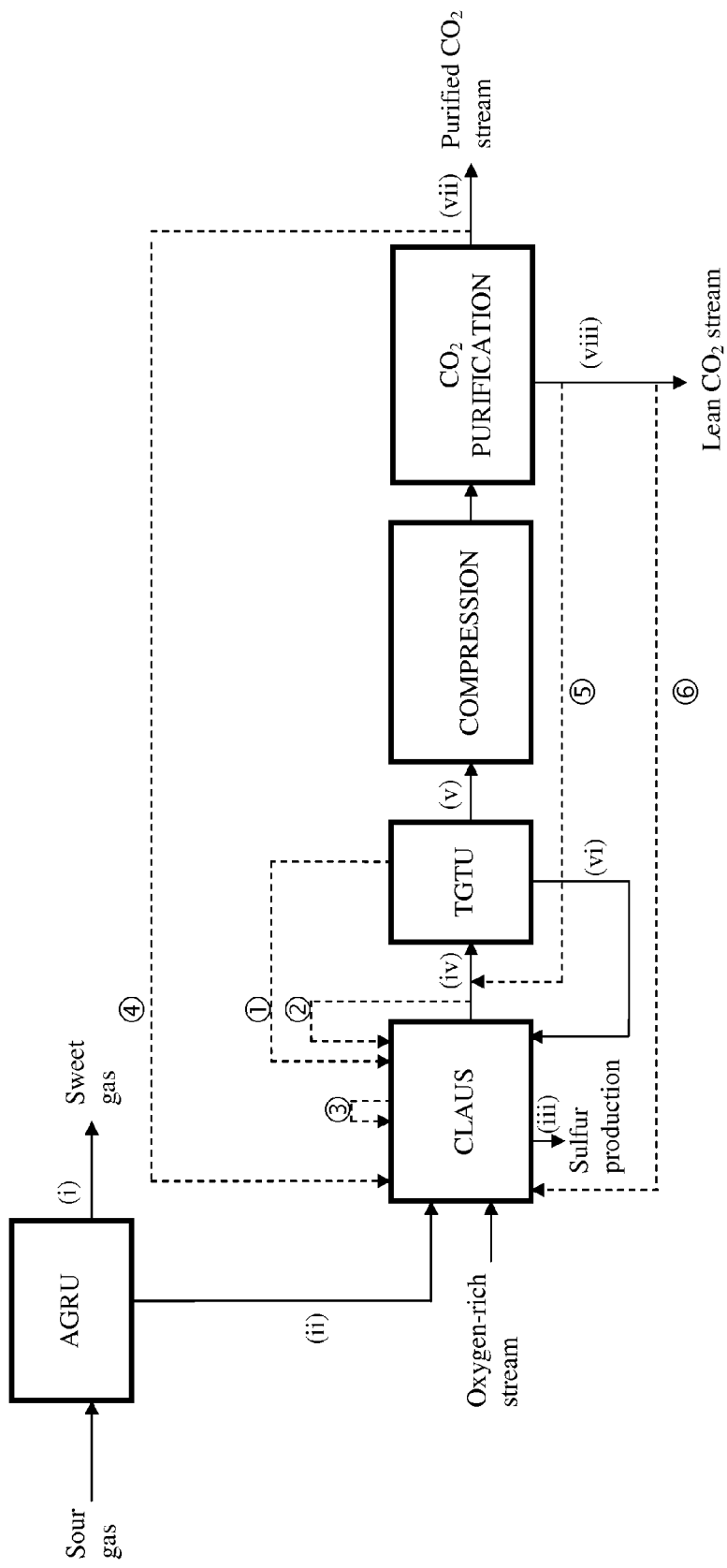
FIG. 2 is a schematic view of the native $CO_2$ recovery unit for performing the method of the present invention.

FIG. 2 provides a schematic view of a native $CO_2$ recovery unit for performing the method of the present invention.

In FIG. 2, a sour gas stream is introduced into an acid gas removal unit (AGRU), thereby providing a sweet gas stream (i) and an acid gas stream (ii) containing 48% of carbon dioxide and 43% of hydrogen sulfide. A classical sweetening method using a chemical, a hybrid or a physical solvent is used as an Acid Gas Removal Unit (AGRU). The acid gas stream (ii) then enters a Claus unit using oxygen-rich stream at a pressure of 1.7-1.9 bar. Matter of fact, the hydrogen sulfide is transformed into elemental sulfur in the Claus unit using oxygen-rich stream as a combustive agent. Two streams exit from the Claus unit: a stream of elemental sulfur (iii) and a tail gas stream (iv) mainly comprising $CO_2$, $H_2$ and sulfur compounds. Then, the tail gas stream (iv) enters a Tail Gas Treatment Unit (TGTU) in order to remove remaining traces of sulfur compounds, thereby producing a gas effluent (v) composed of 85% of carbon dioxide, 10% of hydrogen, 5% of water and 100 ppm of hydrogen sulfide. Then, this gas effluent (v) enters the compression unit, then a $CO_2$ purification unit, thereby forming, on the one hand, a purified carbon dioxide stream (vii) and, on the other hand, a lean carbon dioxide stream (viii) comprising carbon dioxide and hydrogen.

The composition of the purified carbon dioxide stream (vii) and of the lean $CO_2$ stream (viii) will depend on the type of separation technology.

One or several recycle lines may be included in the process:
- recycle line ①, wherein part of the gas stream exiting the quench tower is recycled into the Claus furnace before introduction to the absorber unit,
- recycle line ②, wherein part of the gas stream (iv) exiting the Claus unit is recycled into the Claus furnace before introduction to the TGTU,
- recycle line ③, wherein part of the gas stream inside the Claus unit is recycled into the Claus furnace by internal recycling,
- recycle line ④, wherein part of the purified $CO_2$ gas stream (vii) exiting the $CO_2$ purification unit is recycled into the Claus furnace,
- recycle line ⑤, wherein part of the lean $CO_2$ stream (viii) exiting the $CO_2$ purification unit is recycled between the Claus unit and the hydrogenation reactor of the TGTU,
- recycle line ⑥, wherein part of the lean $CO_2$ stream (viii) exiting the $CO_2$ purification unit is recycled upstream of or directly into the Claus furnace.

Figure 3:
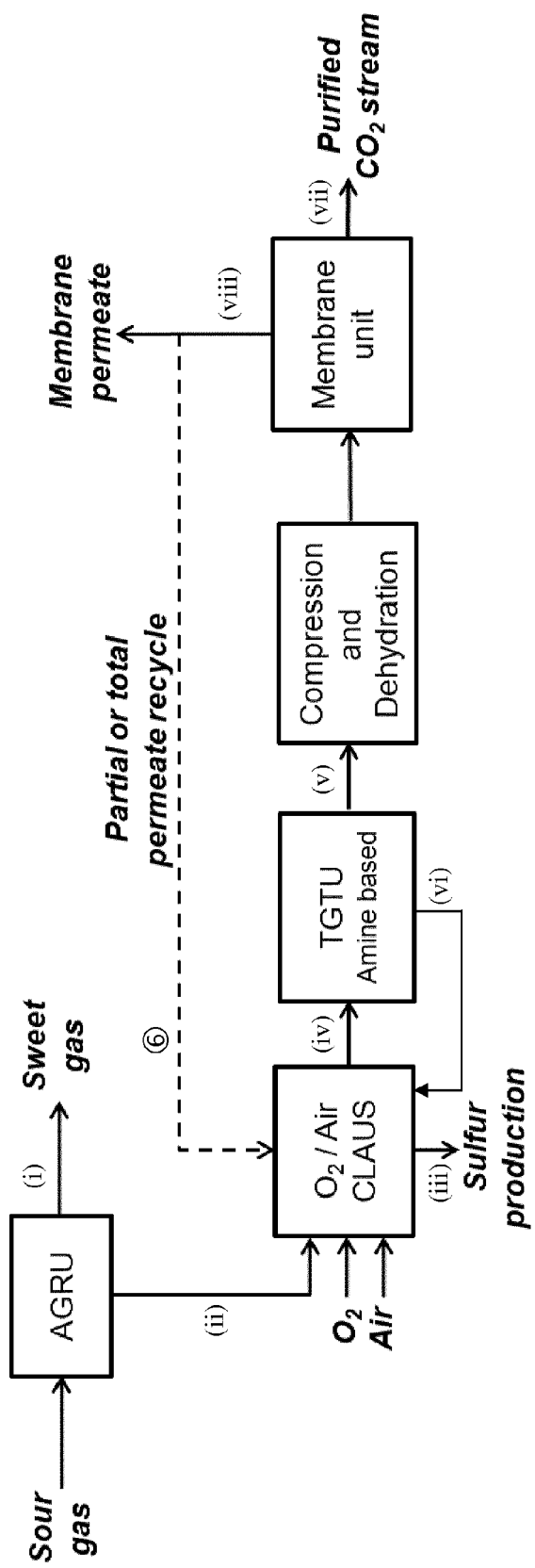
FIG. 3 is a schematic view of the native $CO_2$ recovery unit for performing the method of the present invention, wherein the $CO_2$ purification uses a membrane unit.

FIG. 3 provides a schematic view of a native $CO_2$ recovery unit for performing the method of the present invention, wherein the $CO_2$ purification unit is a membrane.

In FIG. 3, a sour gas stream is introduced into an acid gas removal unit (AGRU), thereby providing a sweet gas stream (i) and an acid gas stream (ii) containing 48% of carbon dioxide and 43% of hydrogen sulfide. A classical sweetening method using a chemical, a hybrid or a physical solvent is used as an Acid Gas Removal Unit (AGRU). The acid gas stream (ii) then enters a Claus unit using oxygen-rich stream as a combustive agent in the Claus furnace, at a pressure of 1.7-1.9 bar. Two streams exit from the Claus unit: a stream of elemental sulfur (iii) and a tail gas stream (iv) mainly comprising $CO_2$, $H_2$ and sulfur compounds. Then, the tail gas stream (iv) enters a Tail Gas Treatment Unit (TGTU), said TGTU being an amine based technology, thereby producing a gas effluent (v) composed of 85% of carbon dioxide, 8% of hydrogen, 7% of water and 100 ppm of hydrogen sulfide. Then, this gas effluent (v) enters a compression unit and a dehydration unit, then a membrane unit for $CO_2$ purification, thereby forming a purified carbon dioxide residue and a permeate stream containing carbon dioxide and hydrogen.

The purified carbon dioxide residue stream (vii), at a pressure close to the compression unit discharge pressure, is composed of 98% of carbon dioxide, 1.7% of hydrogen, 0.3% of carbon monoxide and less than 100 ppm of hydrogen sulfide. The permeate stream (viii), at about 2 bara is composed of approximately 70% of carbon dioxide and 30% of hydrogen. Said membrane permeate stream (viii) is totally or partially recycled upstream of or directly in the Claus unit. As a result of total recycle, typical native $CO_2$ recovery of this process scheme is about 100%.

Figure 4:
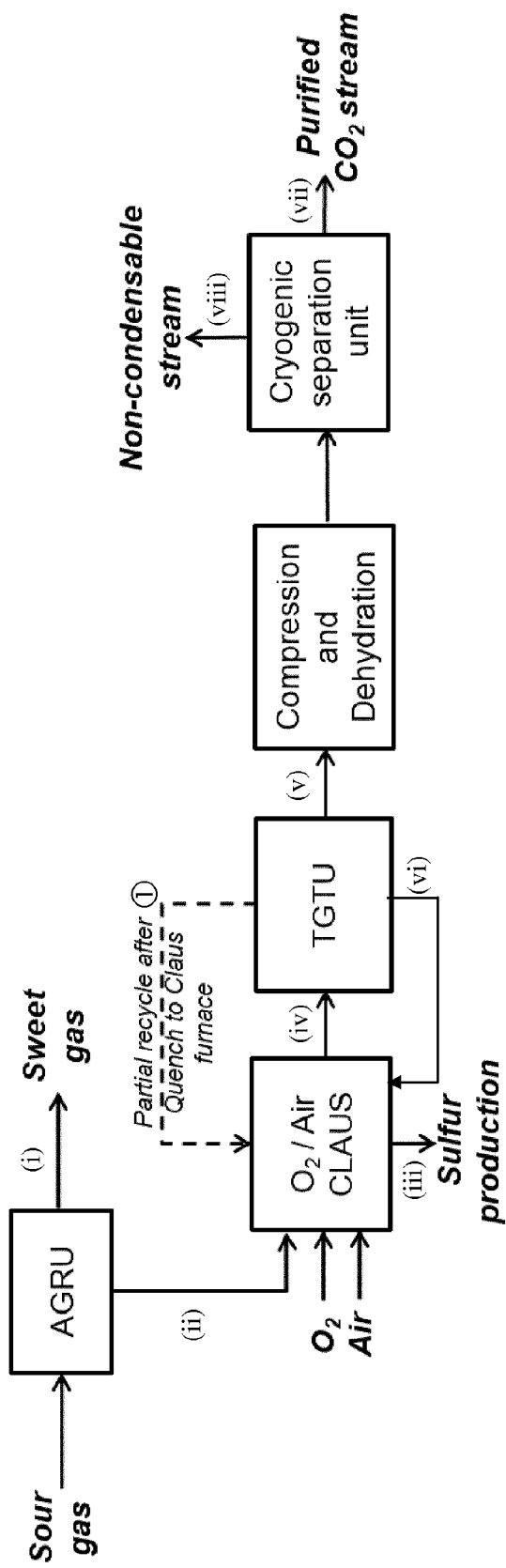
FIG. 4 is a schematic view of the native $CO_2$ recovery unit for performing the method of the present invention, wherein the $CO_2$ purification uses a cryogenic separation unit.

FIG. 4 provides a schematic view of a native $CO_2$ recovery unit for performing the method of the present invention, wherein the $CO_2$ purification unit is a cryogenic unit.

In FIG. 4, a sour gas stream is introduced into an acid gas removal unit (AGRU), thereby providing a sweet gas stream (i) and an acid gas stream (ii) containing 18% of carbon dioxide and 73% of hydrogen sulfide. A classical sweetening method using a chemical, a hybrid or a physical solvent is used as an Acid Gas Removal Unit (AGRU). The acid gas stream (ii) then enters a Claus unit using oxygen-rich stream as a combustive agent in the Claus furnace, at a pressure of 1.7-1.9 bar. Two streams exit from the Claus unit: a stream of elemental sulfur (iii) and a tail gas stream (iv) mainly comprising $CO_2$, $H_2$ and sulfur compounds. Then, the tail gas stream (iv) enters a Tail Gas Treatment Unit (TGTU), said TGTU being an amine based technology. Part of the gas stream after the quench tower is recycled to the Claus furnace, with a composition of 59% $CO_2$, 20% $H_2$ and 4% $H_2S$. Downstream the TGT amine, a gas effluent (v) is produced, composed of 58% of carbon dioxide, 23% of hydrogen, 15% of water and 500 ppm of hydrogen sulfide. Then, this gas effluent (v) enters a compression unit and a dehydration unit, then a cryogenic unit for $CO_2$ purification, thereby forming a purified carbon dioxide product (vii) and a lean $CO_2$ stream (viii) containing hydrogen and some carbon dioxide.

The purified carbon dioxide stream (vii), at around 10 bara, is composed of 99.9% of carbon dioxide and less than 0.1% of hydrogen sulfide. The lean $CO_2$ stream (viii) rich in hydrogen (viii), at about 1.3 bara is composed of approximately 72% of hydrogen and 14% of carbon dioxide, remaining components being argon, carbon monoxide, nitrogen.

The invention claimed is:

1. A method for treating a hydrocarbon feed gas stream containing at least carbon dioxide and hydrogen sulfide to recover a purified $CO_2$ gas stream (vii), said process comprising the following steps:
   a. Separating said hydrocarbon feed gas stream into a sweetened hydrocarbon gas stream (i), and an acid gas stream (ii) comprising at least carbon dioxide and hydrogen sulfide;
   b. Introducing said acid gas stream (ii) into a Claus unit wherein an oxygen-rich stream is used as a combustive agent in a Claus furnace, thereby recovering a liquid stream of elemental sulfur (iii) and a tail gas stream (iv) mainly comprising carbon dioxide, hydrogen and sulfur compounds;
   c. Introducing the exiting tail gas stream (iv) into a Tail Gas Treatment Unit (TGTU) thereby separating said tail gas stream into a $CO_2$ enriched gas stream also containing hydrogen and sweetened in sulfur compounds (v), and a stream enriched in sulfur compounds (vi);
   d. Compressing the $CO_2$ enriched gas stream (v) exiting the TGTU and performing dehydration of the $CO_2$ enriched gas stream exiting the compression unit, thereby obtaining a dehydrated and compressed $CO_2$ enriched gas;
   e. Passing the dehydrated and compressed $CO_2$ enriched gas through a $CO_2$ purification unit thereby recovering a purified $CO_2$ gas stream (vii) and a lean $CO_2$ stream (viii).

2. The method according to claim 1, wherein the combustive agent used in the Claus furnace of the Claus unit is an oxygen-rich stream, wherein the amount of nitrogen does not exceed 50%.

3. The method according to claim 1, wherein the tail gas stream (iv), the $CO_2$ enriched gas stream (v) and the purified $CO_2$ gas stream (vii) also contain nitrogen.

4. The method according to claim 1, wherein the acid gas stream (ii) is enriched in $H_2S$ by an acid gas enrichment unit located upstream the Claus unit.

5. The method according to claim 1, wherein the TGTU comprises a feed inline burner or a tail gas heater, a hydrogenation reactor, a quench contactor and optionally an absorber unit.

6. The method according to claim 1, wherein the $CO_2$ purification unit is a cryogenic separation unit producing the purified $CO_2$ gas stream (vii) and the lean $CO_2$ stream (viii).

7. The method according to claim 1, wherein the $CO_2$ purification unit is a membrane unit producing the purified $CO_2$ gas stream (vii) on the residue side and the lean $CO_2$ stream (viii) on the permeate side.

8. The method according to claim 1, wherein the $CO_2$ purification unit is an adsorption unit producing the purified $CO_2$ gas stream (vii) and the lean $CO_2$ stream (viii).

9. The method according to claim 1, wherein the $CO_2$ purification unit is an absorption unit producing the purified $CO_2$ gas stream (vii) and the lean $CO_2$ stream (viii).

10. The method according to claim 1, wherein the $CO_2$ purification unit is a combination of $CO_2$ purification units.

11. The method according to claim 1, wherein part of the gas stream exiting the Claus unit is recycled into the Claus furnace before introduction to the TGTU.

12. The method according to claim 1, wherein part of the gas stream inside the Claus unit is recycled into the Claus furnace by internal recycling.

13. The method according to claim 5, wherein part of the gas stream exiting the quench contactor is recycled into the Claus furnace before introduction to the absorber unit.

14. The method according to claim 1, wherein part of the purified $CO_2$ gas stream (vii) exiting the $CO_2$ purification unit is recycled into the Claus furnace.

15. The method according to claim 1, wherein part of the lean $CO_2$ stream (viii) exiting the $CO_2$ purification unit is recycled upstream of or directly in the Claus furnace.

16. The method according to claim 1, wherein part of the lean $CO_2$ stream (viii) exiting the $CO_2$ purification unit is recycled between the Claus unit and the hydrogenation reactor of the TGTU.

* * * * *